United States Patent
Otta et al.

(10) Patent No.: US 9,689,241 B2
(45) Date of Patent: Jun. 27, 2017

(54) GAS LIFT VALVE ASSEMBLIES HAVING FLUID FLOW BARRIER AND METHODS OF ASSEMBLING SAME

(71) Applicant: General Electric Company, Schenectady, NY (US)

(72) Inventors: Shourya Prakash Otta, Guilderland, NY (US); Norman Arnold Turnquist, Carlisle, NY (US); Roderick Mark Lusted, Niskayuna, NY (US); Xuele Qi, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 140 days.

(21) Appl. No.: 14/555,260

(22) Filed: Nov. 26, 2014

(65) Prior Publication Data

US 2016/0145982 A1    May 26, 2016

(51) Int. Cl.
*E21B 43/12* (2006.01)
*F16K 1/42* (2006.01)
(Continued)

(52) U.S. Cl.
CPC ............ *E21B 43/123* (2013.01); *E21B 34/06* (2013.01); *F16K 1/42* (2013.01); *F16K 15/063* (2013.01);
(Continued)

(58) Field of Classification Search
CPC ... Y10T 137/2934; F16K 15/025; F16K 1/42; F16K 1/443; E21B 43/123; E21B 34/08; E21B 34/10
(Continued)

(56) References Cited

U.S. PATENT DOCUMENTS

| 2,223,337 A | 11/1940 | Hatfield |
| 2,256,704 A | 9/1941 | Crickmer et al. |

(Continued)

FOREIGN PATENT DOCUMENTS

| GB | 2510070 A | 7/2014 |
| WO | 2014039740 A1 | 3/2014 |

OTHER PUBLICATIONS

PCT Search Report and Written Opinion issued in connection with corresponding PCT Application No. PCT/US2015/061737 on May 6, 2016.

(Continued)

*Primary Examiner* — Mary McManmon
*Assistant Examiner* — Richard K Durden
(74) *Attorney, Agent, or Firm* — Pabitra K. Chakrabarti

(57) ABSTRACT

A gas lift valve assembly includes a housing, a check valve, and a fluid flow barrier. The housing defines an inlet port, an outlet port, and a main flow passage providing fluid communication between the inlet port and the outlet port. The main flow passage has an upstream end and a downstream end. The check valve includes a sealing element disposed at the downstream end of the main flow passage, and a valve member configured to sealingly engage the sealing element. The valve member is movable between an open position in which fluid flow is permitted in a downstream direction, and a closed position in which the valve member inhibits fluid flow in an upstream direction. The fluid flow barrier is disposed within the main flow passage, and is configured to direct fluid flow away from the sealing element when the valve member is in the open position.

19 Claims, 10 Drawing Sheets

(51) Int. Cl.
*F16K 15/06* (2006.01)
*E21B 34/06* (2006.01)
*F16K 25/00* (2006.01)
*F16K 1/44* (2006.01)
*F16K 15/02* (2006.01)

(52) U.S. Cl.
CPC .............. *F16K 25/00* (2013.01); *F16K 1/443* (2013.01); *F16K 15/025* (2013.01)

(58) Field of Classification Search
USPC .......................................................... 137/155
See application file for complete search history.

(56) References Cited

U.S. PATENT DOCUMENTS

| | | | |
|---|---|---|---|
| 2,634,689 A | | 4/1953 | Walton |
| 2,892,415 A | * | 6/1959 | McGowen, Jr. ...... E21B 43/123 |
| | | | 137/155 |
| 2,931,385 A | | 4/1960 | Carlisle et al. |
| 3,143,128 A | | 8/1964 | Bicking, Jr. |
| 3,278,192 A | | 10/1966 | Tamplen |
| 3,302,721 A | | 2/1967 | Yetman |
| 3,381,756 A | | 5/1968 | Reagan |
| 3,398,760 A | | 8/1968 | Fox et al. |
| 3,410,346 A | | 11/1968 | Garrett et al. |
| 3,776,250 A | * | 12/1973 | Knox ...................... E21B 21/10 |
| | | | 137/512.3 |
| 3,844,352 A | | 10/1974 | Garrett |
| 4,151,875 A | * | 5/1979 | Sullaway ............ E21B 33/1293 |
| | | | 166/126 |
| 4,200,158 A | | 4/1980 | Perkins |
| 4,635,725 A | | 1/1987 | Burroughs |
| 4,682,656 A | | 7/1987 | Waters |
| 4,930,539 A | * | 6/1990 | van Rooy ............. F16K 15/063 |
| | | | 137/514 |
| 5,022,427 A | | 6/1991 | Churchman et al. |
| 5,069,280 A | | 12/1991 | McKee et al. |
| 5,707,214 A | | 1/1998 | Schmidt |
| 6,460,620 B1 | | 10/2002 | LaFleur |
| 6,715,550 B2 | | 4/2004 | Vinegar et al. |
| 6,758,276 B2 | | 7/2004 | Reynolds |
| 7,077,208 B2 | | 7/2006 | Harrington et al. |
| 7,228,909 B2 | | 6/2007 | Schmidt et al. |
| 7,360,602 B2 | | 4/2008 | Kritzler et al. |
| 8,181,705 B2 | | 5/2012 | Tveiten et al. |
| 8,225,874 B2 | | 7/2012 | Messick et al. |
| 8,561,703 B2 | | 10/2013 | Mahmoud et al. |
| 8,763,706 B2 | | 7/2014 | Lembcke |
| 2004/0221997 A1 | | 11/2004 | Giroux et al. |
| 2009/0044947 A1 | | 2/2009 | White et al. |
| 2011/0203805 A1 | * | 8/2011 | Kritzler ................. E21B 43/123 |
| | | | 166/373 |
| 2011/0315401 A1 | | 12/2011 | White et al. |
| 2012/0204977 A1 | * | 8/2012 | Lembcke ............. E21B 43/123 |
| | | | 137/511 |
| 2013/0075108 A1 | | 3/2013 | Frisby et al. |
| 2013/0206239 A1 | | 8/2013 | Stokka et al. |
| 2013/0255947 A1 | | 10/2013 | Frisby et al. |
| 2013/0255958 A1 | | 10/2013 | Frisby et al. |
| 2013/0255961 A1 | | 10/2013 | Frisby et al. |
| 2013/0291961 A1 | | 11/2013 | Tveiten et al. |
| 2014/0041863 A1 | | 2/2014 | Dowling et al. |
| 2014/0138099 A1 | | 5/2014 | Scarsdale et al. |
| 2015/0144826 A1 | * | 5/2015 | Bayyouk ............... F16K 25/005 |
| | | | 251/359 |

OTHER PUBLICATIONS

PCT Search Report and Written Opinion issued in connection with Application No. PCT/US15/061815 on Feb. 25, 2016.

* cited by examiner

GAS LIFT VALVE ASSEMBLIES HAVING FLUID FLOW BARRIER AND METHODS OF ASSEMBLING SAME

BACKGROUND

The field of the disclosure relates generally to artificial gas lift systems, and more particularly, to gas lift valve assemblies having a fluid flow barrier and methods of assembling such gas lift valve assemblies.

Artificial gas lift systems are often used to facilitate the extraction of fluids, such as hydrocarbons, from subterranean fluid-containing formations having insufficient pressure to naturally force fluids out of the formation through a wellbore. Such gas lift systems generally include a well casing lining the wellbore, and a production tubing extending into the fluid-containing formation. Pressurized fluid is injected into the production tubing through an annulus defined between the production tubing and the well casing. The pressurized fluid enters the production tubing through one or more gas lift valve assemblies disposed at various depths along the production tubing. The pressurized fluid displaces denser production fluids within the production tubing, thereby decreasing the hydrostatic pressure within the production tubing and enhancing the rate at which fluids can be extracted from the subterranean formation.

Industry standards for acceptable leak rates through gas lift valve assemblies used in artificial gas lift systems have become increasingly stringent in recent years, particularly for off-shore and deep sea gas lift systems. Meeting such industry standards using known gas lift valve assemblies has presented significant challenges due in part to the wide range of pressures and temperatures experienced within the production tubing during operation.

Some known gas lift valve assemblies utilize a check valve to inhibit fluid within the production tubing from leaking to the annulus. The sealing components of such gas lift valve assemblies, however, are typically located directly in the path of fluid flow. As a result, the sealing surfaces of the sealing components are exposed to high velocity fluid flow, which may contain solid, abrasive particles, causing rapid wear of the sealing components.

Accessing gas lift valve assemblies within the gas lift system for maintenance or repairs is generally difficult, costly, and requires a significant amount of down time for the gas lift system. Such down time can result in a significant amount of production losses. In some instances, for example, accessing a gas lift valve assembly for maintenance or repairs can require one to two days of down time, and can have a total cost in excess of $1 million. Accordingly, a continuing need exists for a gas lift valve assembly having an acceptable leak rate and an improved service life.

BRIEF DESCRIPTION

In one aspect, a gas lift valve assembly is provided. The gas lift valve assembly includes a housing, a check valve, and a fluid flow barrier. The housing defines an inlet port, an outlet port, and a main flow passage providing fluid communication between the inlet port and the outlet port. The main flow passage has an upstream end and a downstream end. The check valve includes a sealing element disposed at the downstream end of the main flow passage, and a valve member configured to sealingly engage the sealing element. The valve member is movable between an open position in which fluid flow is permitted in a downstream direction, and a closed position in which the valve member inhibits fluid flow in an upstream direction. The fluid flow barrier is disposed within the main flow passage, and is configured to direct fluid flow away from the sealing element when the valve member is in the open position.

In another aspect, a method of assembling a gas lift valve assembly is provided. The method includes providing a housing defining an inlet port, an outlet port, and a main flow passage providing fluid communication between the inlet port and the outlet port, the main flow passage having an upstream end and a downstream end, providing a sealing element at the downstream end of the main flow passage, coupling a valve member to the housing such that the valve member is moveable between an open position in which fluid flow is permitted in a downstream direction, and a closed position in which the valve member sealingly engages the sealing element, and providing a fluid flow barrier within the main flow passage such that the fluid flow barrier directs fluid away from the sealing element when the valve member is in the open position.

In yet another aspect, a gas lift system is provided. The gas lift system includes a production tubing defining a central passageway, a well casing defining an annulus between the production tubing and the outer casing, and a gas lift valve assembly coupled in fluid communication between the annulus and the central passageway. The gas lift valve assembly includes a housing, a check valve, and a fluid flow barrier. The housing defines an inlet port, an outlet port, and a main flow passage providing fluid communication between the inlet port and the outlet port. The main flow passage has an upstream end and a downstream end. The check valve includes a sealing element disposed at the downstream end of the main flow passage, and a valve member configured to sealingly engage the sealing element. The valve member is movable between an open position in which fluid flow is permitted from the annulus to the central passageway, and a closed position in which the valve member inhibits fluid flow from the central passageway to the annulus. The fluid flow barrier is disposed within the main flow passage, and is configured to direct fluid flow away from the sealing element when the valve member is in the open position.

DRAWINGS

These and other features, aspects, and advantages of the present disclosure will become better understood when the following detailed description is read with reference to the accompanying drawings in which like characters represent like parts throughout the drawings, wherein.

Figure 1:
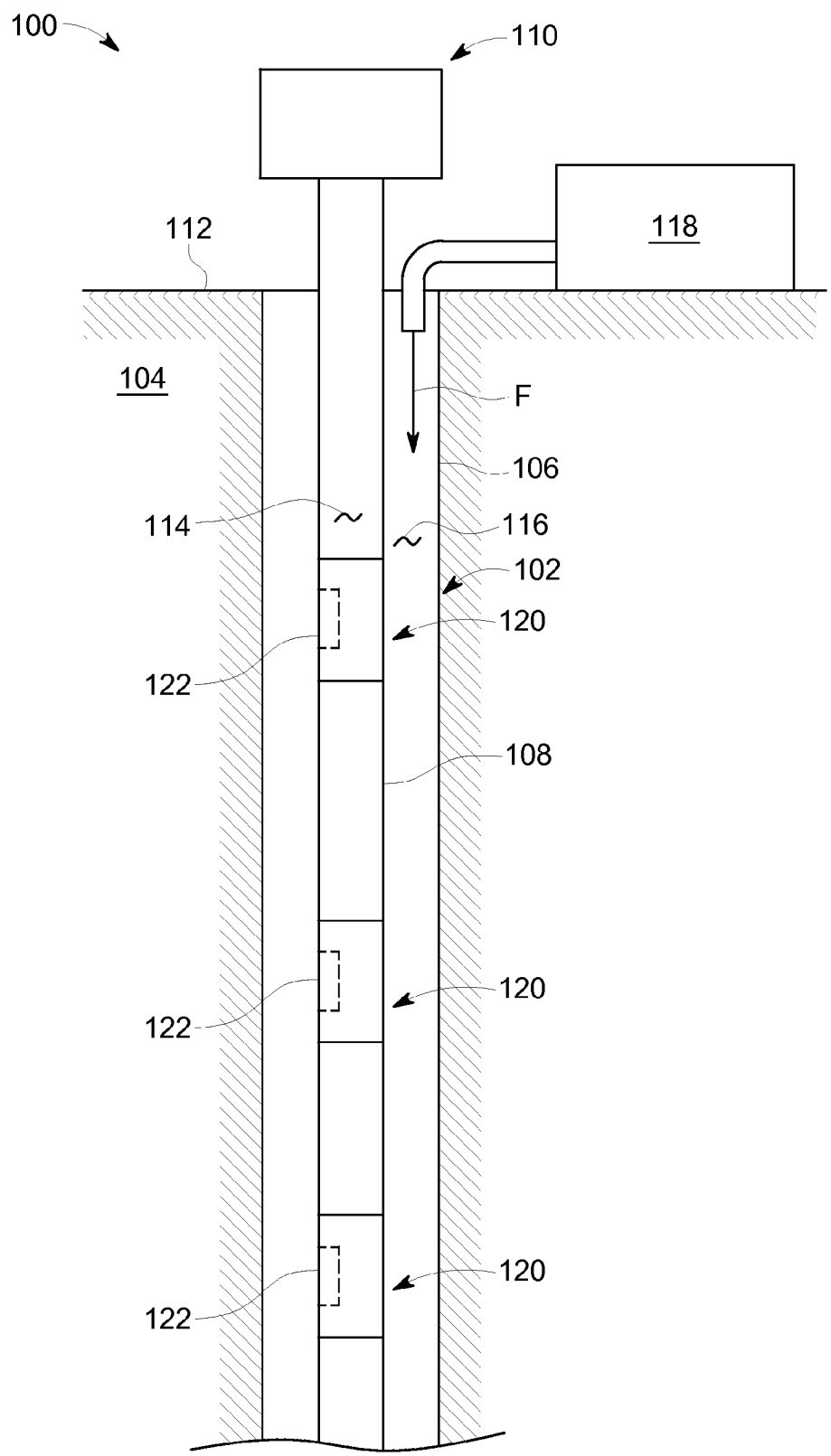
FIG. 1 is a schematic view of an exemplary gas lift system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The systems, methods, and apparatus described herein facilitate reducing the leakage rate and improving the service life of gas lift valve assemblies used in gas lift systems. In particular, the gas lift valve assemblies described herein utilize a check valve having multiple sealing elements configured to sealingly engage a valve member at various pressure differentials. The check valve thereby provides a suitable barrier to leakage in an upstream direction across a wide range of pressures within a production tubing of gas lift systems. Additionally, the gas lift valve assemblies described herein facilitate improving the service life of gas lift valve assemblies, and decreasing the down time of gas lift systems by minimizing the wear of sealing components with the gas lift valve assemblies. In particular, the gas lift valve assemblies described herein utilize a fluid flow barrier configured to protect sealing components of the valve assembly from high velocity fluid flow and solid, abrasive particles contained within such fluids. In some embodiments, for example, the fluid flow barrier includes an annular collar configured to shield sealing components of the valve assembly from high velocity fluid flow, and to direct fluid flow away from sealing surfaces of the sealing components. Further, in some embodiments, the gas lift valve assemblies described herein utilize a uniquely shaped valve member configured to divert fluid flow away from a sealing surface of the valve member, and to inhibit solid particles from bouncing upstream and contacting other sealing components of the valve assembly.

FIG. 1 is a schematic view of an exemplary gas lift system, indicated generally at 100, for removing fluids from a fluid-containing formation (not shown). In the exemplary embodiment, gas lift system 100 includes a wellbore 102 extending through the earth 104 to the fluid-containing formation. Wellbore 102 is lined with a well casing 106, and a production tubing 108 is disposed within well casing 106 and extends from a wellhead 110 at a surface 112 of earth 104 to the formation. Production tubing 108 defines a central passageway 114 through which fluid from the formation is communicated to wellhead 110. An outer annulus 116 is defined between production tubing 108 and well casing 106. A fluid injection device 118 is coupled in fluid communication with outer annulus 116 for injecting a pressurized fluid F, such as pressurized gas, into outer annulus 116 to create artificial lift within central passageway 114. Gas lift system 100 also includes a plurality of side pocket mandrels 120, each having a gas lift valve assembly 122 disposed therein for controlling fluid communication between outer annulus 116 and central passageway 114. Each mandrel 120 is coupled in series with production tubing 108 at each end of mandrel 120 by suitable connecting means including, for example and without limitation, a threaded connection.

Figure 2:
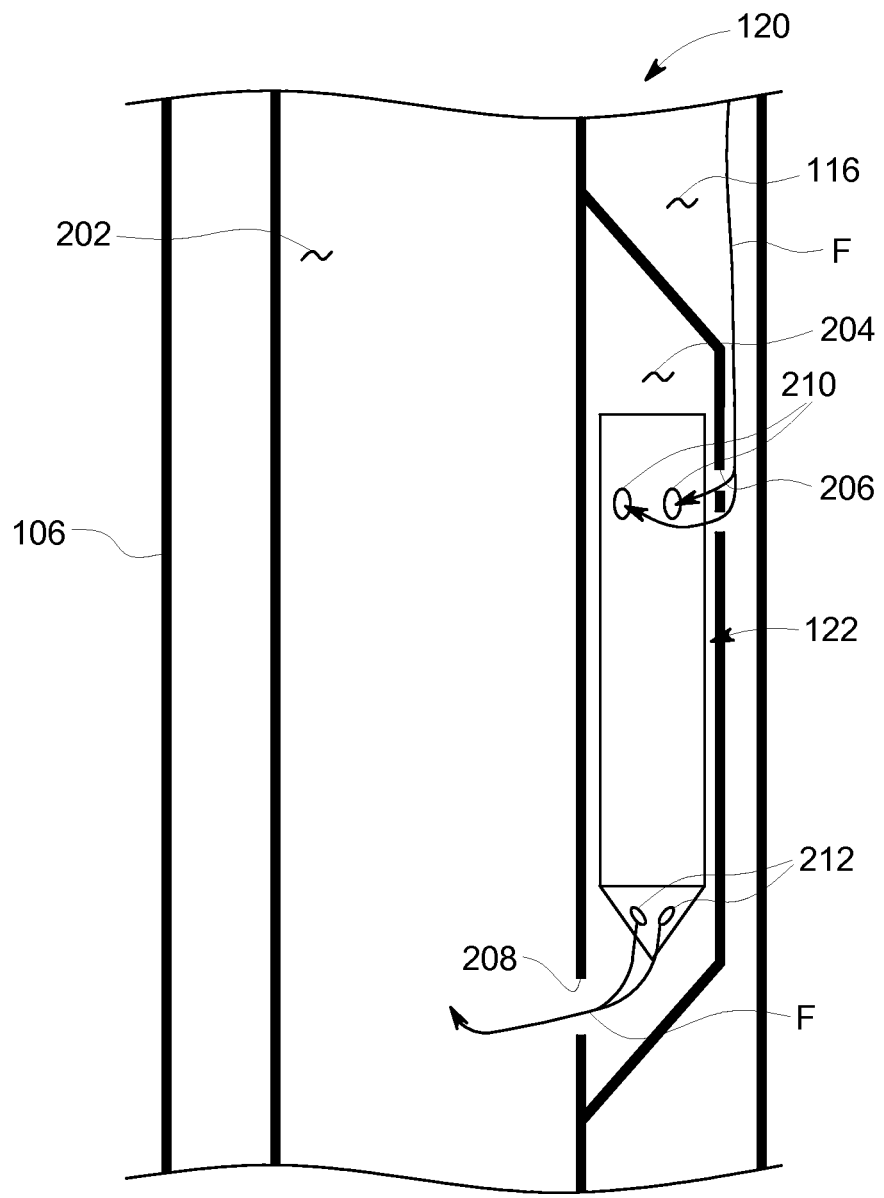
FIG. 2 is a schematic view of a mandrel of the gas lift system of FIG. 1 including a gas lift valve assembly.

FIG. 2 is a schematic view of one of mandrels 120 of FIG. 1, illustrating one of gas lift valve assemblies 122 disposed therein. As shown in FIG. 2, mandrel 120 defines a longitudinal passageway 202 and a side pocket 204 sized and shaped to receive one of gas lift valve assemblies 122 therein. Longitudinal passageway 202 is coupled in serial fluid communication with central passageway 114 of production tubing 108 (shown in FIG. 1). Mandrel 120 defines at least one mandrel inlet port 206 providing fluid communication between outer annulus 116 and side pocket 204, and at least one mandrel outlet port 208 providing fluid communication between side pocket 204 and longitudinal passageway 202.

Gas lift valve assembly 122 is configured to control fluid flow between outer annulus 116 and central passageway 114 (shown in FIG. 1) to ensure proper operation of gas lift system 100. More specifically, gas lift valve assembly 122 includes a plurality of inlet ports 210, a plurality of outlet ports 212, and one or more valve assemblies coupled in fluid communication between inlet ports 210 and outlet ports 212. At least one of the valve assemblies within gas lift valve assembly 122 is a one-way valve, also referred to as a check valve or barrier valve, configured to permit fluid flow in a downstream direction from outer annulus 116 to central passageway 114 (shown in FIG. 1) (i.e., from inlet ports 210 to outlet ports 212), and to inhibit fluid flow in an upstream direction from central passageway 114 (shown in FIG. 1) to outer annulus 116 (i.e., from outlet ports 212 to inlet ports 210). Mandrel 120 may include one or more sealing elements (not shown) disposed radially between gas lift valve assembly 122 and mandrel 120, and longitudinally between inlet ports 210 and outlet ports 212 to inhibit fluid flow along an exterior of gas lift valve assembly 122.

In operation, pressurized fluid F, such as gas, is injected into outer annulus 116 by fluid injection device 118. Pressurized fluid F is injected at a sufficient pressure such that pressurized fluid F is forced generally downward through outer annulus 116 to a depth at which one of mandrels 120 and one of gas lift valve assemblies 122 are located. Pressurized fluid F enters side pocket 204 of mandrel 120 through mandrel inlet ports 206, and enters gas lift valve assembly 122 through inlet ports 210. Pressurized fluid F is injected at a sufficient pressure to create a positive pressure differential between the upstream side of gas lift valve assembly 122 and the downstream side of gas lift valve assembly 122, thereby opening the one-way valve within gas lift valve assembly 122 and enabling fluid flow through gas lift valve assembly 122. Pressurized fluid F flows through gas lift valve assembly 122, out of outlet ports 212, and is injected into central passageway 114 (shown in FIG. 1) through mandrel outlet port 208. Pressurized fluid F displaces generally denser fluids from the fluid containing formation within central passageway 114, thereby reducing hydrostatic pressure within central passageway 114 and enabling or enhancing fluid flow from the fluid-containing formation to the wellhead 110 (shown in FIG. 1).

Figure 3:
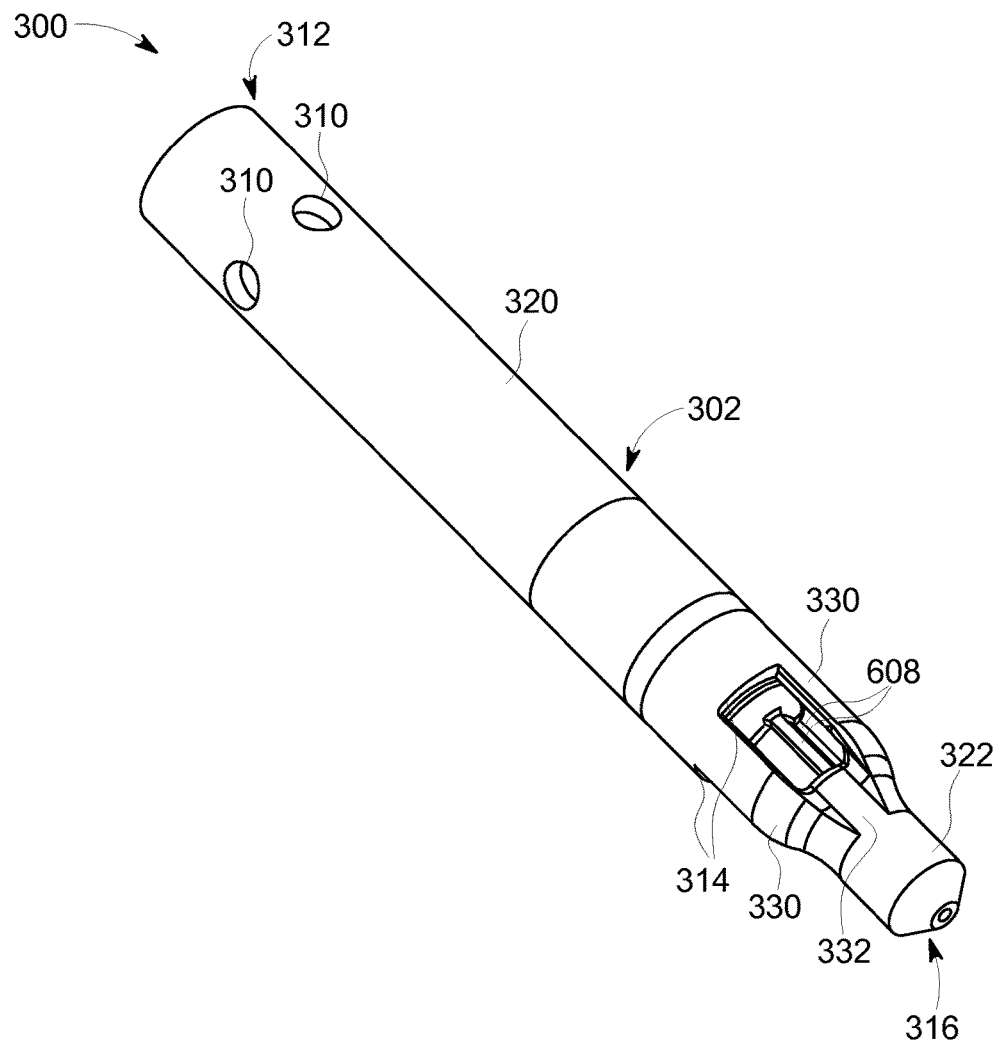
FIG. 3 is a perspective view of an exemplary gas lift valve assembly suitable for use in the gas lift system of FIG. 1.
Figure 4:
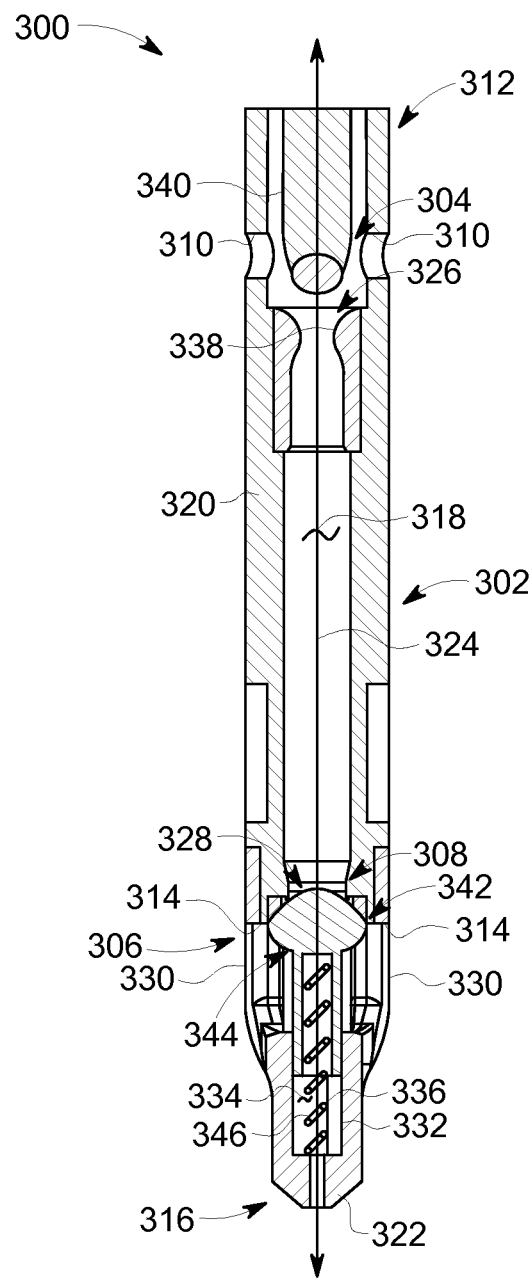
FIG. 4 is a side cut-away view of the gas lift valve assembly of FIG. 3 including an injection control valve and a check valve, the check valve shown in a closed position.
Figure 5:
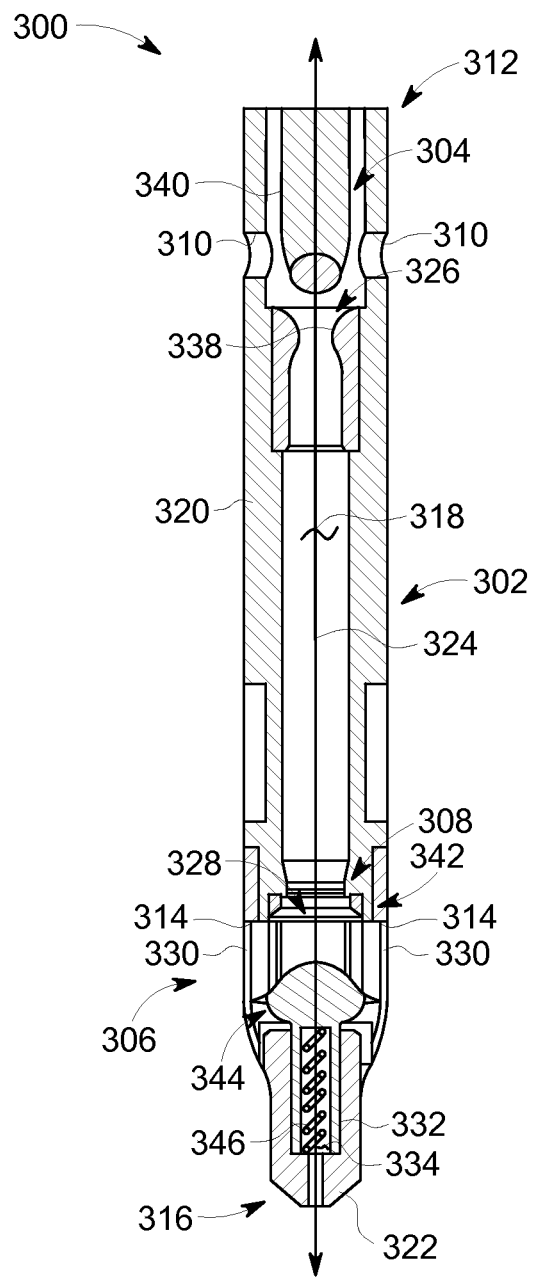
FIG. 5 is a side cut-away view of the gas lift valve assembly of FIG. 4 showing the check valve in an open position.

FIG. 3 is a perspective view of an exemplary gas lift valve assembly, indicated generally at 300, suitable for use in gas lift system 100 of FIGS. 1 and 2. FIGS. 4 and 5 are side cut-away views of gas lift valve assembly 300 of FIG. 3. In the exemplary embodiment, gas lift valve assembly 300 includes a housing 302, an injection control valve 304 (broadly, a first valve), a check valve 306 (broadly, a second valve), and a fluid flow barrier 308. FIG. 4 shows check valve 306 in a closed position, and FIG. 5 shows check valve 306 in an open position.

Housing 302 defines a plurality of inlet ports 310 at an upstream end 312 of gas lift valve assembly 300, a plurality of outlet ports 314 at a downstream end 316 of gas lift valve assembly 300, and a main flow passage 318 providing fluid communication between inlet ports 310 and outlet ports 314. Gas lift valve assembly 300 is configured to receive pressurized fluid F from outer annulus 116 (shown in FIG. 1) through inlet ports 310, and expel pressurized fluid F through outlet ports 314.

In the exemplary embodiment, housing 302 includes an upper housing portion 320 and a lower housing portion 322. Upper housing portion 320 extends from upstream end 312 of gas lift valve assembly 300 towards downstream end 316 of gas lift valve assembly 300, and is coupled to lower housing portion 322 by suitable connecting means including, for example and without limitation, a threaded connection. Lower housing portion 322 extends from upper housing portion 320 to downstream end 316 of gas lift valve assembly 300. Housing 302 may be constructed from a variety of suitable materials including, for example and without limitation steel alloys (e.g., 316 stainless steel, 17-4 stainless steel), nickel alloys (e.g., 400 Monel®), and nickel-chromium based alloys (e.g., 718 Inconel®).

In the exemplary embodiment, upper housing portion 320 defines inlet ports 310 and main flow passage 318. Main flow passage 318 extends along a longitudinal direction 324 of gas lift valve assembly 300 from an upstream end 326 of main flow passage 318 to a downstream end 328 of main flow passage 318. In other embodiments, main flow passage 318 may be at least partially defined by other portions of housing 302, such as lower housing portion 322.

In the exemplary embodiment, lower housing portion 322 defines outlet ports 314. Lower housing portion 322 includes a plurality of housing ribs 330 defining outlet ports 314, and an annular sidewall 332 coupled to each housing rib 330. Each outlet port 314 is defined by a pair of housing ribs 330. Housing ribs 330 are spaced circumferentially about lower housing portion 322 at a sufficient angular distance to permit sufficient fluid flow through outlet ports 314. In the exemplary embodiment, housing 302 includes three housing ribs 330, only two of which are shown in FIGS. 3-6. Other embodiments may include more than or less than three housing ribs.

Annular sidewall 332 is positioned radially inward from outlet ports 314, and extends in longitudinal direction 324. Annular sidewall 332 defines a longitudinally extending cylindrical recess 334 also positioned radially inward from outlet ports 314. Annular sidewall 332 also defines a plurality of longitudinal slots 336 (shown in FIG. 4) extending radially outward from recess 334. Slots 336 are configured to cooperate with components of check valve 306 to maintain alignment and prevent undesired rotation of components of check valve 306.

In the exemplary embodiment, housing 302 also includes a venturi nozzle 338 disposed at upstream end 326 of main flow passage 318. Venturi nozzle 338 is configured to regulate the mass flow of pressurized fluid F injected into gas lift valve assembly 300.

Injection control valve 304 is coupled in fluid communication between inlet ports 310 and main flow passage 318, and is configured to regulate fluid flow between inlet ports 310 and main flow passage 318. Injection control valve 304 is also coupled in serial fluid communication with and upstream from check valve 306. In the exemplary embodiment, injection control valve 304 includes a valve member 340 moveable between an open position (shown in FIGS. 4 and 5) in which injection control valve 304 permits fluid flow between inlet ports 310 and main flow passage 318, and a closed position (not shown) in which injection control valve 304 inhibits fluid flow between inlet ports 310 and main flow passage 318. When valve member 340 is in the closed position, valve member 340 sealingly engages a valve seat defined by housing 302. In the exemplary embodiment, the valve seat of injection control valve 304 is defined by venturi nozzle 338.

Injection control valve 304 also includes a suitable biasing member (not shown) operably coupled to valve member 340 and configured to bias valve member 340 towards the closed position. In one embodiment, for example, valve member 340 is coupled to a bellows system that exerts a biasing force on valve member 340 to maintain valve member 340 in the closed position. The biasing force exerted on valve member 340 may correspond to a predetermined threshold pressure of pressurized fluid F needed to activate the biasing member and open valve member 340.

Check valve 306 is disposed at downstream end 328 of main flow passage 318, and is coupled in fluid communication between main flow passage 318 and outlet ports 314. Check valve 306 is configured to permit fluid flow in the downstream direction (i.e., from inlet ports 310 to outlet ports 314) and inhibit fluid flow in the upstream direction (i.e., from outlet ports 314 to inlet ports 310). In the exemplary embodiment, check valve 306 includes a sealing mechanism 342, a valve member 344 configured to sealingly engage sealing mechanism 342 when valve member 344 is in the closed position, and a biasing member 346 operably coupled to valve member 344 and configured to bias valve member 344 towards the closed position.

Valve member 344 is moveable between a closed position (shown in FIG. 4) in which valve member 344 sealingly engages sealing mechanism 342, and an open position (shown in FIG. 5) in which valve member 344 permits fluid flow in the downstream direction. Biasing member 346 exerts a biasing force against valve member 344, and biases valve member 344 towards the closed position (shown in FIG. 4). Valve member 344 is configured to move between the open position and the closed position based on a pressure differential across valve member 344. Specifically, when the pressure differential from the upstream side of valve member 344 to the downstream side of valve member 344 is sufficient to overcome the biasing force of biasing member 346, valve member 344 moves to the open position. When the pressure differential from the upstream side of valve member 344 to the downstream side of valve member 344 falls below the threshold pressure needed to overcome the biasing force of biasing member 346 (e.g., when the pressure in central passageway 114 of production tubing 108 (shown in FIG. 1) is greater than the pressure in outer annulus 116 (shown in FIG. 1)), valve member 344 moves to the closed position (shown in FIG. 4).

Valve member 344 may be constructed from a variety of suitable materials including, for example and without limitation, steel alloys (e.g., 316 stainless steel, 17-4 stainless steel), nickel alloys (e.g., 400 Monel®), and nickel-chromium based alloys (e.g., 718 Inconel®).

Figure 6:
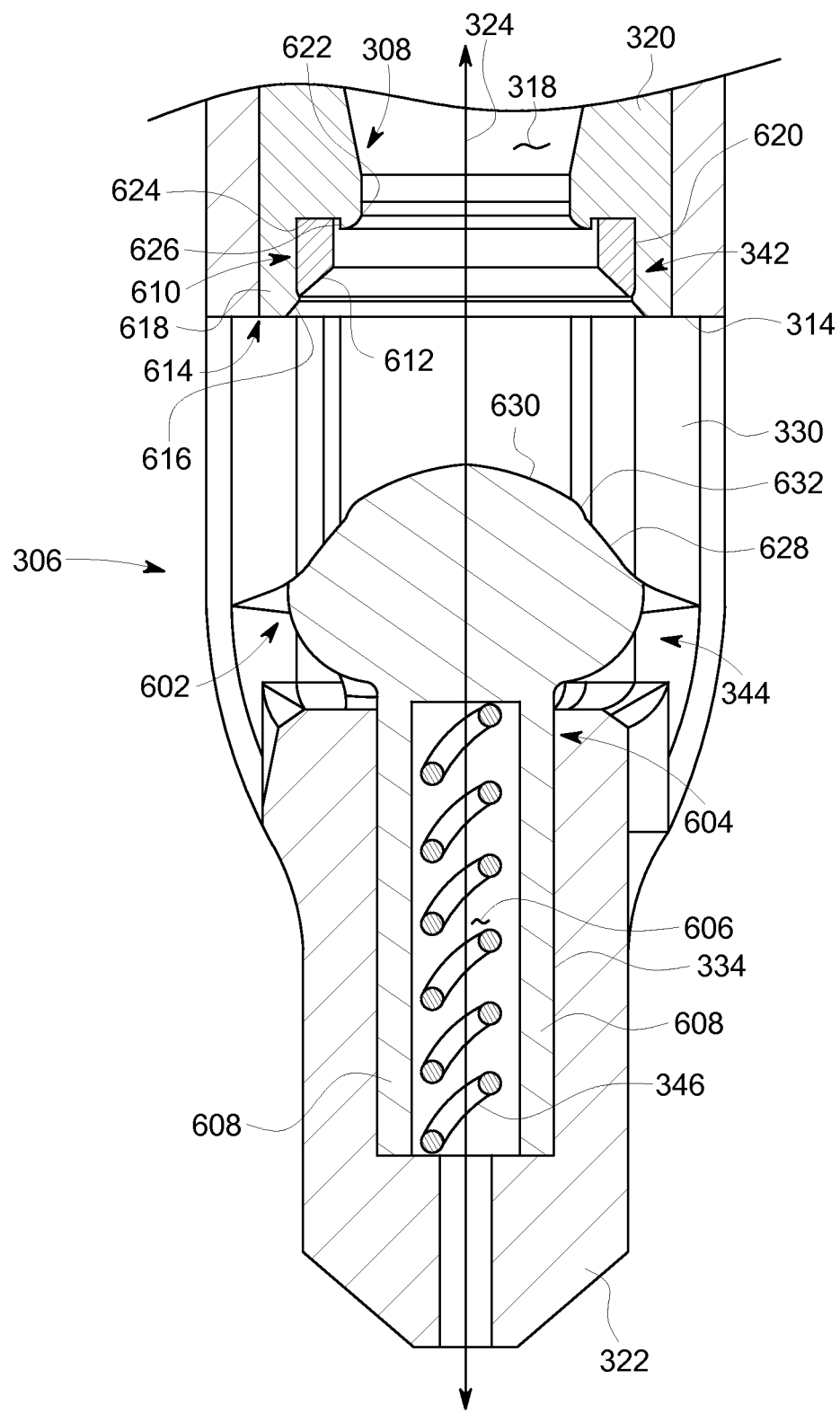
FIG. 6 is a partial side cut-away view of the gas lift valve assembly of FIG. 4.

In the exemplary embodiment, as shown in FIG. 6, valve member 344 includes a bulb-shaped portion 602 and an elongated valve stem 604 extending longitudinally from bulb-shaped portion 602 in the downstream direction. Bulb-shaped portion 602 is configured to sealingly engage sealing mechanism 342 when valve member 344 is in the closed position. Valve stem 604 is received within recess 334 defined by lower housing portion 322, and is configured to slide in longitudinal direction 324 within recess 334 as valve member 344 moves between the open and closed positions. Valve stem 604 defines a cylindrical cavity 606 in which biasing member 346 is received. Specifically, when gas lift valve assembly 300 is assembled, biasing member 346 is disposed within cavity 606 between valve member 344 and lower housing portion 322. In the exemplary embodiment, biasing member 346 is a compression spring, although biasing member 346 may include any suitable biasing element that enables gas lift valve assembly 300 to function as described herein. In some embodiments, biasing member 346 may be omitted from check valve 306, and valve member 344 may be actuated based solely on a pressure differential across valve member 344.

In the exemplary embodiment, valve member 344 also includes a plurality of protrusions 608 (also shown in FIG. 3) elongate in the sliding direction of valve member 344 (i.e., longitudinal direction 324). Each protrusion 608 is sized and shaped complementary to one of slots 336 (shown in FIG. 4) defined by lower housing portion 322, and is configured to be received in a corresponding slot 336. Protrusions 608 cooperate with slots 336 to maintain alignment of valve member 344 and to inhibit rotation of valve member 344 about longitudinal direction 324.

Sealing mechanism 342 is disposed at downstream end 328 of main flow passage 318. As shown in FIG. 6, sealing mechanism 342 includes a low pressure sealing element 610 (broadly, a first sealing element) defining a low pressure sealing surface 612, and a high pressure sealing element 614 (broadly, a second sealing element) defining a high pressure sealing surface 616. Valve member 344 is configured to sealingly engage low pressure sealing element 610 at a first pressure differential across valve member 344, and is configured to sealingly engage high pressure sealing element 614 at a second pressure differential across valve member 344 that is greater than the first pressure differential. Specifically, as the pressure differential across valve member 344 increases, the back pressure acting on valve member 344 compresses low pressure sealing element 610, and forces valve member 344 into sealing engagement with high pressure sealing surface 616. As the pressure differential continues to increase, high pressure sealing element 614 absorbs a greater portion of the contact stresses between valve member 344 and sealing mechanism 342 than low pressure sealing element 610 does. Thus, even at relatively high pressures, low pressure sealing surface 612 is subjected to only slightly higher contact stresses, thereby reducing the amount of wear on low pressure sealing surface 612 at high pressures, and increasing the service life of low pressure sealing element 610.

Low pressure sealing element 610 is generally ring-shaped, and may be constructed from a variety of suitable materials including, for example and without limitation, elastomers and thermoplastics, such as polytetrafluoroethylene (PTFE). In the exemplary embodiment, high pressure sealing element 614 is defined by housing 302. Specifically, high pressure sealing surface 616 is defined by a radial outer wall 618 of upper housing 302 extending downstream from low pressure sealing element 610. In other embodiments, sealing mechanism 342 may include a high pressure sealing element formed separately from housing 302. In one embodiment, for example, sealing mechanism 342 includes a ring-shaped high pressure sealing element disposed within an annular groove defined by housing 302.

High pressure sealing element 614 is suitably stiffer than and has a greater modulus of elasticity than the low pressure sealing element 610, and is suitably constructed from one or more metal alloys. Suitable metals from which high pressure sealing element 614 may be constructed include, for example and without limitation, the same materials from which housing 302 is constructed.

As shown in FIG. 6, low pressure sealing element 610 is outwardly tapered as low pressure sealing element 610 extends in the downstream direction. The outward taper of low pressure sealing element 610 facilitates reducing wear of low pressure sealing surface 612 by reducing direct exposure to fluid flow through main flow passage 318. In the exemplary embodiment, high pressure sealing surface 616 is positioned downstream from low pressure sealing surface 612 defined by low pressure sealing element 610. In other embodiments, high pressure sealing surface 616 may be positioned upstream from low pressure sealing surface 612.

Gas lift valve assembly 300 is configured to facilitate minimizing the wear of sealing components, such as low pressure sealing element 610 and high pressure sealing element 614, within gas lift valve assembly 300. For example, fluid flow barrier 308 is disposed within main flow passage 318, and is configured to shield low pressure sealing element 610 and high pressure sealing element 614 from fluid flow when valve member 344 is in the open position. Specifically, fluid flow barrier 308 at least partially encloses low pressure sealing element 610 within an annular groove 620 defined by housing 302, and directs fluid flow radially inward and away from low pressure sealing element 610 and high pressure sealing element 614.

In the exemplary embodiment, fluid flow barrier 308 comprises an annular collar 622 coupled to upper housing portion 320. Collar 622 extends radially inward into main flow passage 318 from upper housing portion 320, and has a diameter smaller than a diameter of main flow passage 318. Collar 622 at least partially defines annular groove 620 in which low pressure sealing element 610 is positioned. Specifically, collar 622 extends downstream from an upper surface 624 of upper housing portion 320 partially defining groove 620, and defines a radial inner surface 626 circumscribing annular groove 620. In the exemplary embodiment, collar 622 is defined by housing 302, specifically upper housing portion 320. That is, collar 622 is formed integrally with upper housing portion 320. In other embodiments, collar 622 may be formed separately from housing 302, and coupled to housing 302 within main flow passage 318 by suitable connectors.

Valve member 344 is configured to reduce erosion of the sealing surface of valve member 344 caused by high velocity fluid flow and solid, abrasive particles within the fluid. Specifically, valve member 344 includes a sealing surface 628 configured to sealingly engage low pressure sealing element 610 and high pressure sealing element 614, and a fluid diversion surface 630 configured to divert fluid away from sealing surface 628. As shown in FIG. 6, sealing surface 628 is offset from fluid diversion surface 630 by a distance in the downstream direction. That is, fluid diversion surface 630 is positioned upstream from sealing surface 628. Further, fluid diversion surface 630 is generally convex, and adjoins sealing surface 628 at an inflection point 632 where sealing surface 628 is concave. The configuration and arrangement of fluid diversion surface 630 and sealing surface 628 causes fluid flowing through main flow passage 318 to contact fluid diversion surface 630 before sealing surface 628. Fluid diversion surface 630 diverts fluid and solid particles within such fluid in a radial outward direction away from sealing surface 628, thereby reducing erosion of sealing surface 628 of valve member 344 caused by high velocity fluid flow and solid, abrasive particles within the fluid.

In some embodiments, fluid diversion surface 630 may include an erosion resistant coating configured to inhibit erosion of fluid diversion surface 630. Suitable erosion resistant coatings include, for example and without limitation, silicon carbide coatings. Erosion resistant coatings may be applied to valve member 344 using a variety of suitable processes including, for example and without limitation, plasma vapor deposition. Additionally or alternatively, an erosion resistant coating may be applied to one or both of collar 622 and sealing surface 628 to inhibit erosion of the respective components.

Valve member 344 is also configured to reduce erosion of low pressure sealing element 610 and high pressure sealing element 614 caused by solid particles bouncing off valve member 344 and contacting low pressure sealing element 610 and high pressure sealing element 614. Specifically, fluid diversion surface 630 is configured to deflect solid particles contained within the pressurized fluid F radially outward and downstream from low pressure sealing element 610 and high pressure sealing element 614, thereby inhibiting solid particles from bouncing back upstream and contacting low pressure sealing element 610 and high pressure sealing element 614.

Figure 7:
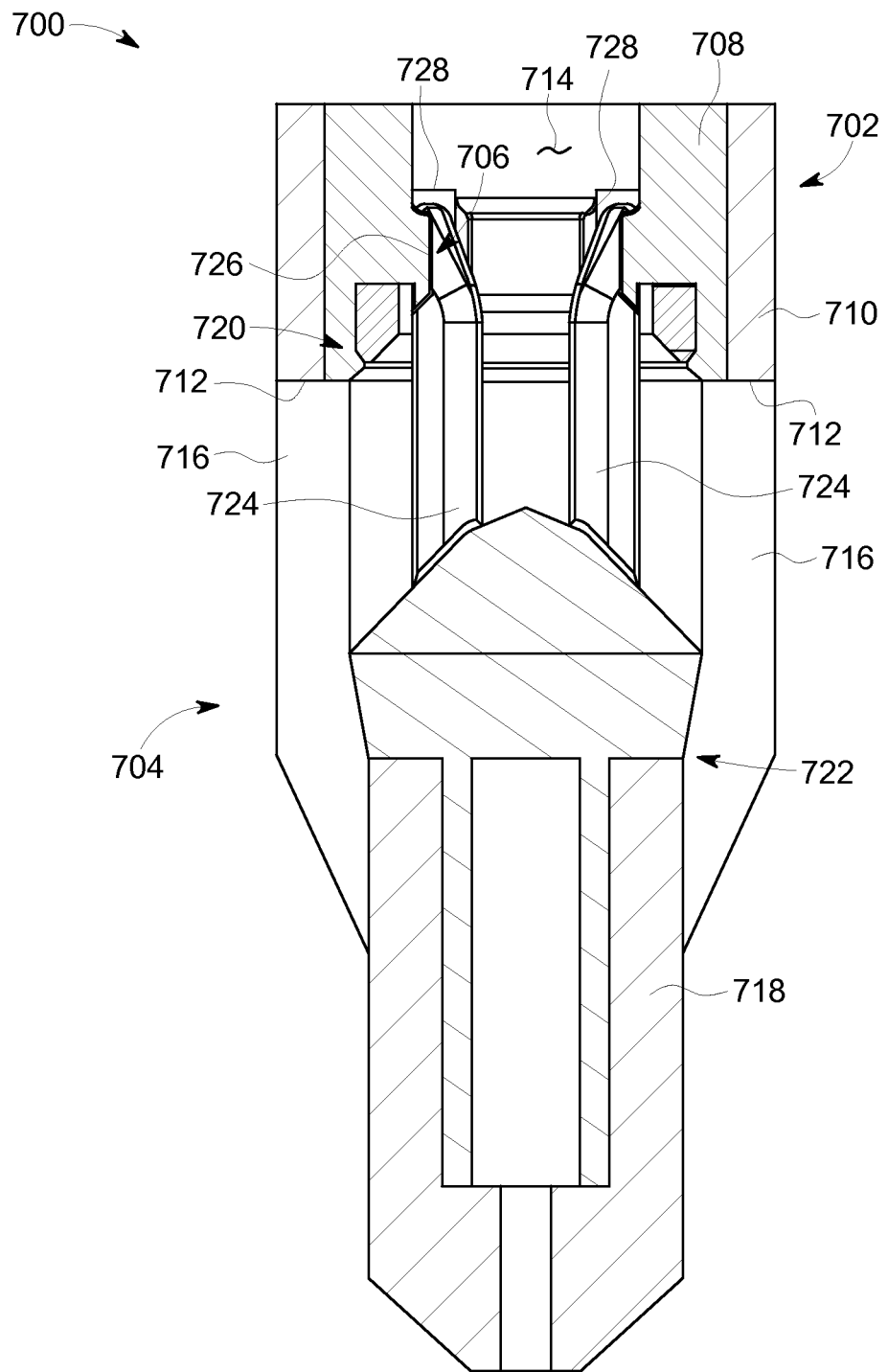
FIG. 7 is a partial side cut-away view of another embodiment of a gas lift valve assembly suitable for use in the gas lift system of FIGS. 1 and 2.

FIG. 7 is a partial side cut-away view of another gas lift valve assembly 700 suitable for use in gas lift system 100 of FIGS. 1 and 2. As shown in FIG. 7, gas lift valve assembly 700 includes a housing 702, a check valve 704, and a fluid flow barrier 706. Gas lift valve assembly 700 may also include an injection control valve, such as injection control valve 304 described above with reference to FIGS. 3-5. Unless otherwise noted, gas lift valve assembly 700 is substantially identical to gas lift valve assembly 300 described above with reference to FIGS. 3-6.

Housing 702 includes an upper housing portion 708 defining a plurality of inlet ports (not shown), and a lower housing portion 710 defining a plurality of outlet ports 712. Housing 702 also defines a main flow passage 714 providing fluid communication between inlet ports (not shown) and outlet ports 712. Lower housing portion 710 includes a plurality of housing ribs 716 that define outlet ports 712, and an annular sidewall 718 coupled to each housing rib 716. Each outlet port 712 is defined by a pair of housing ribs 716. Housing ribs 716 are spaced circumferentially about lower housing portion 710 at a sufficient angular distance to permit sufficient fluid flow through outlet ports 712. In the illustrated embodiment, housing 702 includes three housing ribs 716, only two of which are shown in FIG. 7. Other embodiments may include more than or less than three housing ribs.

Check valve 704 includes a sealing mechanism 720 and a valve member 722 configured to sealingly engage sealing mechanism 720 to inhibit fluid flow in an upstream direction. Valve member 722 is moveable between a closed position (not shown) in which valve member 722 sealingly engages sealing mechanism 720, and an open position (shown in FIG. 7) in which valve member 722 permits fluid flow in the downstream direction. Check valve 704 may also include a biasing member (not shown), such as biasing member 346 (shown in FIGS. 4 and 5), configured to bias valve member 722 towards the closed position.

In the embodiment illustrated in FIG. 7, valve member 722 includes a plurality of alignment ribs 724 (broadly, alignment members) extending longitudinally upstream into main flow passage 714. Alignment ribs 724 are circumferentially spaced about valve member 722 at equal angular intervals. The illustrated embodiment includes three alignment ribs 724, only two of which are shown in FIG. 7. In other embodiments, valve member 722 may include more than or less than three alignment ribs.

In the embodiment illustrated in FIG. 7, fluid flow barrier 706 comprises an annular collar 726 defined by housing 702. Collar 726 extends radially inward into main flow passage 714 from upper housing portion 708, and is configured to shield components of sealing mechanism 720 from fluid flow when valve member 722 is in the open position. Collar 726 functions in substantially the same manner as collar 622 described above with reference to FIG. 6.

In the embodiment illustrated in FIG. 7, collar 726 defines a plurality of longitudinally extending slots 728 spaced circumferentially around collar 726. Each slot 728 is configured to cooperate with one of alignment ribs 724 of valve member 722 to maintain alignment of valve member 722 within gas lift valve assembly 700. Specifically, each alignment rib 724 is sized and shaped complementary to one of slots 728 defined by collar 726. Each alignment rib 724 is configured to slidingly engage collar 726 within one of slots 728 when valve member 722 moves between the open position and the closed position to inhibit rotation and maintain alignment of valve member 722 within gas lift valve assembly 700.

Alignment ribs 724 are also configured to shield housing 702 from fluid flow to reduce erosion of housing 702 caused by high velocity fluid flow and solid particles contained within the fluid. Specifically, each alignment rib 724 is radially aligned with one of housing ribs 716. Each alignment rib 724 is also outwardly tapered as alignment rib 724 extends radially outward such that fluid flowing through gas lift valve assembly 700 is directed around alignment rib 724 and an associated housing rib 716. In the embodiment illustrated in FIG. 7, each alignment rib 724 is spaced radially inward from a corresponding housing rib 716 to permit some fluid flow between alignment rib 724 and housing rib 716 to prevent build-up of solid particles.

Figure 8:
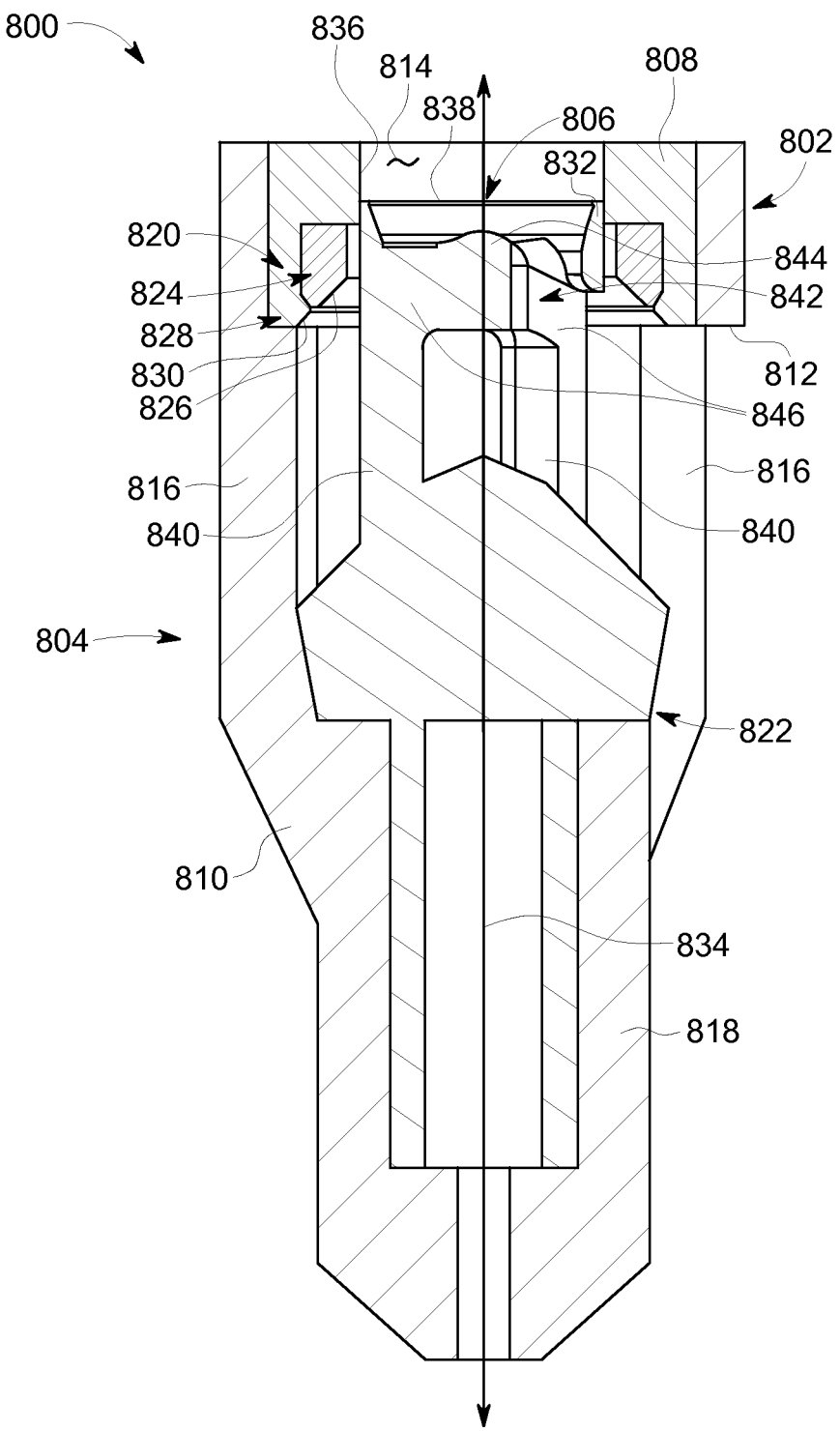
FIG. 8 is a partial side cut-away view of yet another embodiment of a gas lift valve assembly suitable for use in the gas lift system of FIGS. 1 and 2.

FIG. 8 is a partial side cut-away view of another gas lift valve assembly 800 suitable for use in gas lift system 100 of FIGS. 1 and 2. As shown in FIG. 8, gas lift valve assembly 800 includes a housing 802, a check valve 804, and a fluid flow barrier 806. Gas lift valve assembly 800 may also include an injection control valve, such as injection control valve 304 described above with reference to FIGS. 3-5. Unless otherwise noted, gas lift valve assembly 800 is substantially identical to gas lift valve assembly 300 described above with reference to FIGS. 3-6.

Housing 802 includes an upper housing portion 808 defining a plurality of inlet ports (not shown), and a lower housing portion 810 defining a plurality of outlet ports 812. Housing 802 also defines a main flow passage 814 providing fluid communication between inlet ports (not shown) and outlet ports 812. Lower housing portion 810 includes a plurality of housing ribs 816 that define outlet ports 812, and an annular sidewall 818 coupled to each housing rib 816. Each outlet port 812 is defined by a pair of housing ribs 816. Housing ribs 816 are spaced circumferentially about lower housing portion 810 at a sufficient angular distance to permit sufficient fluid flow through outlet ports 812. In the illustrated embodiment, housing 802 includes three housing ribs 816, only two of which are shown in FIG. 8. Other embodiments may include more than or less than three housing ribs.

Check valve 804 includes a sealing mechanism 820 and a valve member 822 configured to sealingly engage sealing mechanism 820 to inhibit fluid flow in an upstream direction. Valve member 822 is moveable between a closed position (not shown) in which valve member 822 sealingly engages sealing mechanism 820, and an open position (shown in FIG. 8) in which valve member 822 permits fluid flow in the downstream direction. Sealing mechanism 820 includes a low pressure sealing element 824 (broadly, a first sealing element) defining a low pressure sealing surface 826, and a high pressure sealing element 828 (broadly, a second sealing element) defining a high pressure sealing surface 830. Low pressure sealing element 824 and high pressure sealing element 828 are substantially identical to low pressure sealing element 610 and high pressure sealing element 614, respectively, shown in FIG. 6. Check valve 804 may also include a biasing member (not shown), such as biasing member 346 (shown in FIGS. 4 and 5), configured to bias valve member 822 towards the closed position.

In the embodiment illustrated in FIG. 8, fluid flow barrier 806 comprises an annular collar 832 configured to slide in a longitudinal direction 834 of gas lift valve assembly 800 within main flow passage 814. Specifically, collar 832 is coupled to valve member 822, and is configured to move in longitudinal direction 834 within main flow passage 814 when valve member 822 moves between the open position (shown in FIG. 8) and the closed position (not shown).

Collar 832 is sized and shaped for sliding engagement with a radial inner surface 836 of housing 802 that defines main flow passage 814. Collar 832 extends a suitable length in longitudinal direction 834 such that collar 832 substantially covers low pressure sealing element 824 when valve member 822 is in the open position (shown in FIG. 8). Further, collar 832 is free of openings, such as slots or holes, that would otherwise permit fluid flow through collar 832. As such, collar 832 completely covers low pressure sealing element 824 along a radial inner surface of low pressure sealing element 824 when valve member 822 is in the open position. Collar 832 thereby shields low pressure sealing element 824 from fluid flow through main flow passage 814.

Collar 832 is also configured to reduce erosion of sealing mechanism 820 by diverting fluid flow away from sealing components of sealing mechanism 820. Specifically, as shown in FIG. 8, an upstream end 838 of collar 832 is tapered radially inward as collar 832 extends in the downstream direction. Fluid flowing through main flow passage 814 is thereby directed radially inward and away from low pressure sealing element 824 and high pressure sealing element 828 when valve member 822 is in the open position (shown in FIG. 8).

In the embodiment illustrated in FIG. 8, collar 832 is coupled to valve member 822 by a plurality of interconnecting members 840 extending in longitudinal direction 834. Interconnecting members 840 are circumferentially spaced about valve member 822 at equal angular intervals. Each interconnecting member 840 is radially aligned with one of housing ribs 816. The illustrated embodiment includes three interconnecting members 840, only two of which are shown in FIG. 8. In other embodiments, valve member 822 may include more than or less than three interconnecting members. In the embodiment illustrated in FIG. 8, collar 832 is formed integrally with valve member 822. In other embodiments, collar 832 may be formed separately from valve member 822 and coupled to valve member 822 by interconnecting members 840.

Valve member 822 also includes a fluid guiding member 842 coupled adjacent the upstream end of valve member 822. Fluid guiding member 842 is configured to guide fluid flowing out of main flow passage 814 towards outlet ports 812, and generally away from housing ribs 816 to reduce erosion of housing 802 caused by high velocity fluid flow and solid particles contained within the fluid. In the illustrated embodiment, fluid guiding member 842 includes a central hub 844 and a plurality of arms 846 extending radially outward from hub 844. Each arm 846 extends from hub 844 radially towards one of interconnecting members 840, and is coupled to collar 832 adjacent one of interconnecting members 840. Fluid guiding member 842 cooperates with interconnecting members 840 to direct fluid flowing out of main flow passage 814 towards outlet ports 812, and to shield housing ribs 816 from fluid flow to reduce erosion of housing 802 caused by high velocity fluid flow and solid particles contained within the fluid. The illustrated embodiment includes three arms 846, two of which are shown in FIG. 8. Other embodiments may include more or less than three arms.

Figure 9:
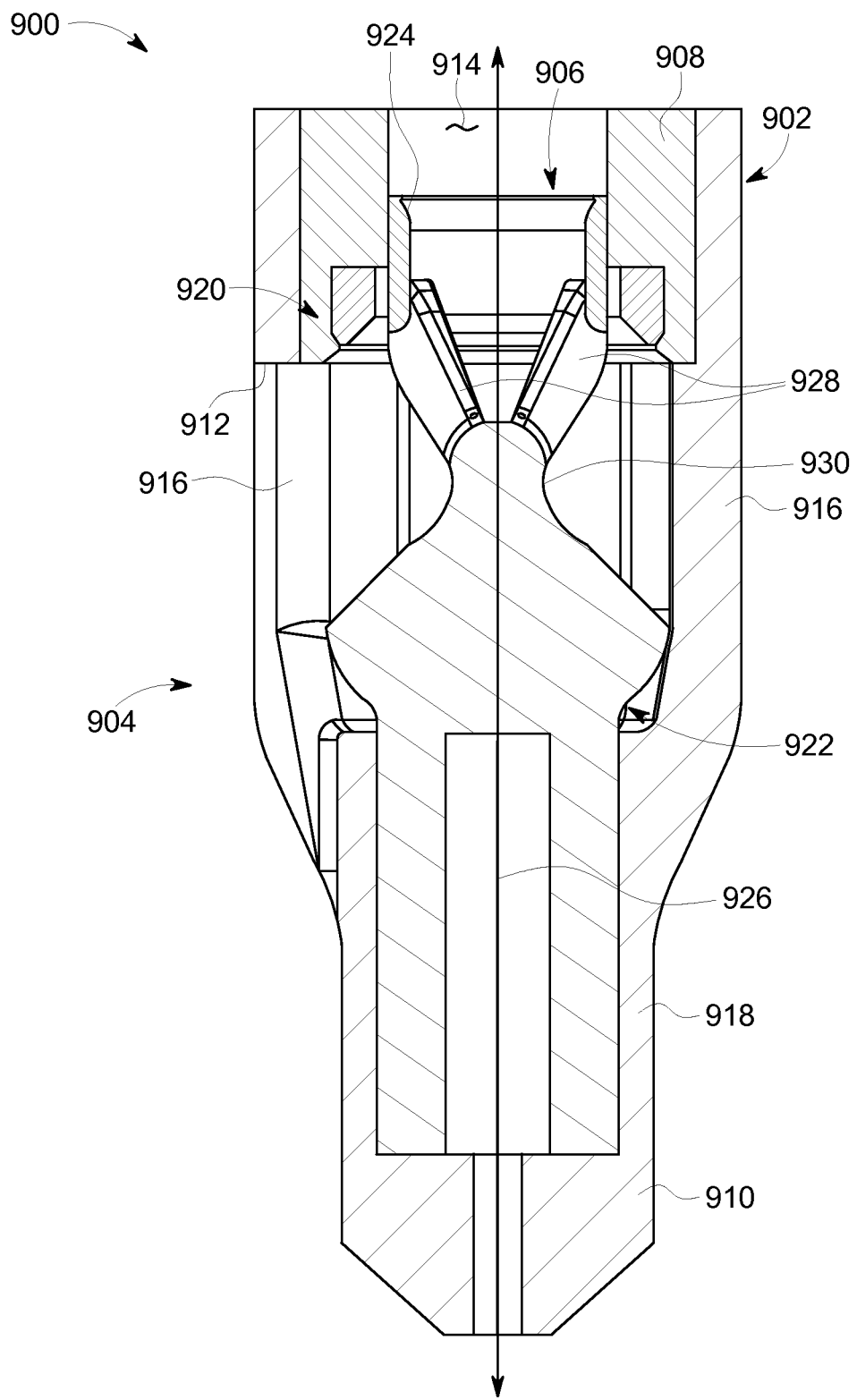
FIG. 9 is a partial side cut-away view of yet another embodiment of a gas lift valve assembly suitable for use in the gas lift system of FIGS. 1 and 2.

FIG. 9 is a partial side cut-away view of another gas lift valve assembly 900 suitable for use in gas lift system 100 of FIGS. 1 and 2. As shown in FIG. 9, gas lift valve assembly 900 includes a housing 902, a check valve 904, and a fluid flow barrier 906. Gas lift valve assembly 900 may also include an injection control valve, such as injection control valve 304 described above with reference to FIGS. 3-5. Unless otherwise noted, gas lift valve assembly 900 is substantially identical to gas lift valve assembly 300 described above with reference to FIGS. 3-6.

Housing 902 includes an upper housing portion 908 defining a plurality of inlet ports (not shown), and a lower housing portion 910 defining a plurality of outlet ports 912. Housing 902 also defines a main flow passage 914 providing fluid communication between inlet ports (not shown) and outlet ports 912. Lower housing portion 910 includes a plurality of housing ribs 916 that define outlet ports 912, and an annular sidewall 918 coupled to each housing rib 916. Each outlet port 912 is defined by a pair of housing ribs 916. Housing ribs 916 are spaced circumferentially about lower housing portion 910 at a sufficient angular distance to permit sufficient fluid flow through outlet ports 912. In the illustrated embodiment, housing 902 includes three housing ribs 916, only two of which are shown in FIG. 9. Other embodiments may include more than or less than three housing ribs.

Check valve 904 includes a sealing mechanism 920 and a valve member 922 configured to sealingly engage sealing mechanism 920 to inhibit fluid flow in an upstream direction. Valve member 922 is moveable between a closed position (not shown) in which valve member 922 sealingly engages sealing mechanism 920, and an open position (shown in FIG. 9) in which valve member 922 permits fluid flow in the downstream direction. Check valve 904 may also include a biasing member (not shown), such as biasing member 346 (shown in FIGS. 4 and 5), configured to bias valve member 922 towards the closed position.

In the embodiment illustrated in FIG. 9, fluid flow barrier 906 comprises an annular collar 924 configured to slide in a longitudinal direction 926 of gas lift valve assembly 900 within main flow passage 914. Specifically, collar 924 is coupled to valve member 922, and is configured to move in longitudinal direction 926 within main flow passage 914 when valve member 922 moves between the open position (shown in FIG. 9) and the closed position (not shown).

In the embodiment illustrated in FIG. 9, collar 924 and valve member 922 are substantially identical to collar 832 and valve member 822, respectively, shown in FIG. 8, except collar 924 is coupled to valve member 922 by a plurality of interconnecting members 928 emanating from a raised central portion 930 of valve member 922. Interconnecting members 928 extend upstream from central portion 930 at an oblique angle with respect to a longitudinal direction 926 of gas lift valve assembly 900. The illustrated embodiment includes three interconnecting members 928, two of which are shown in FIG. 9. Other embodiments may include more than or less than three interconnecting members. The arrangement of raised central portion 930 and interconnecting members 928 functions similarly to fluid guiding member 842 shown in FIG. 8 by directing fluid towards outlet ports 912, and shielding housing ribs 916 from fluid flow.

Figure 10:
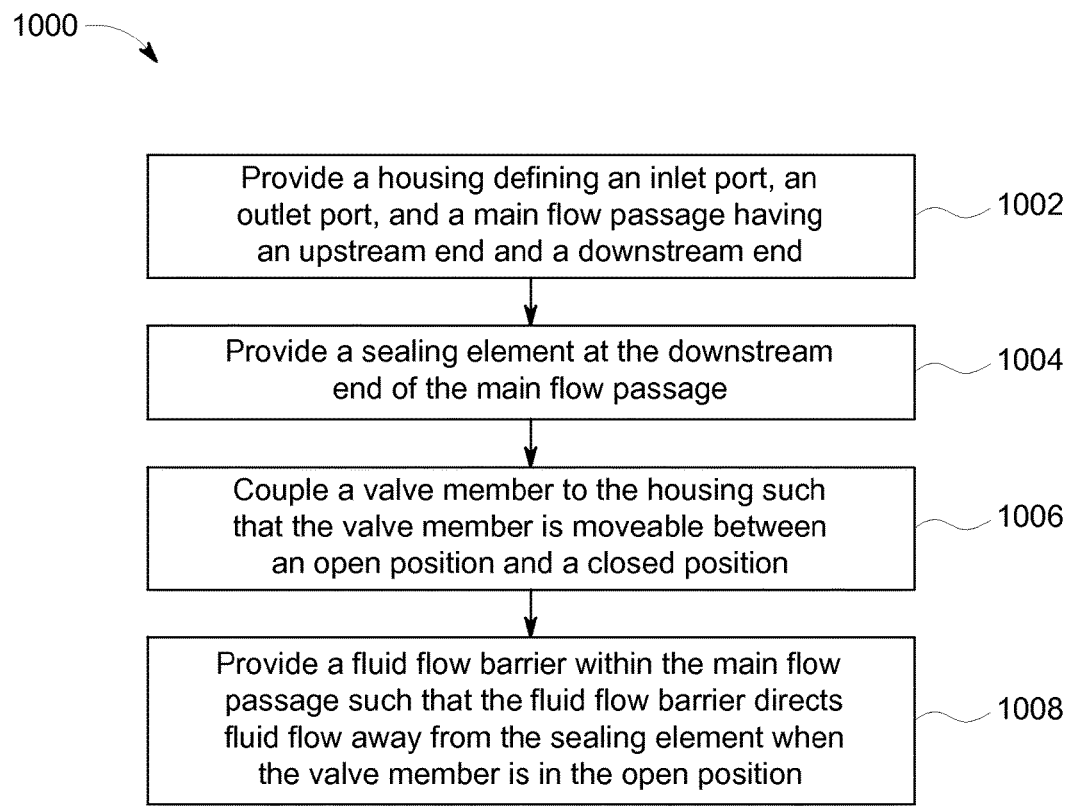
FIG. 10 is a flow chart of an exemplary method for assembling a gas lift valve assembly.

FIG. 10 is a flow chart of an exemplary method 1000 of assembling a gas lift valve assembly, such as gas lift valve assembly 300 shown in FIGS. 3-6. Referring to FIGS. 3-6, in the exemplary method, a housing, such as housing 302 (shown in FIGS. 3-5), is provided 1002 that defines an inlet port, an outlet port, and a main flow passage having an upstream end and a downstream end. The main flow passage provides fluid communication between the inlet port and the outlet port. A sealing element, such as low pressure sealing element 610 (shown in FIG. 6), is provided 1004 at the downstream end of the main flow passage. A valve member, such as valve member 344 (shown in FIGS. 4-6), is coupled 1006 to the housing such that the valve member is moveable between an open position in which fluid flow is permitted in a downstream direction, and a closed position in which the valve member sealingly engages the sealing element. A fluid flow barrier, such as fluid flow barrier 308 (shown in FIGS. 4-6), is provided 1008 within the main flow passage such that the fluid flow barrier directs fluid flow away from the sealing element when the valve member is in the open position.

The systems, methods, and apparatus described herein facilitate reducing the leakage rate and improving the service life of gas lift valve assemblies used in gas lift systems. In particular, the gas lift valve assemblies described herein utilize a check valve having multiple sealing elements configured to sealingly engage a valve member at various pressure differentials. The check valve thereby provides a suitable barrier to leakage in an upstream direction across a wide range of pressures within a production tubing of gas lift systems. Additionally, the gas lift valve assemblies described herein facilitate improving the service life of gas lift valve assemblies, and decreasing the down time of gas lift systems by minimizing the wear of sealing components with the gas lift valve assemblies. In particular, the gas lift valve assemblies described herein utilize a fluid flow barrier configured to protect sealing components of the valve assembly from high velocity fluid flow and solid, abrasive particles contained within such fluids. In some embodiments, for example, the fluid flow barrier includes an annular collar configured to shield sealing components of the valve assembly from high velocity fluid flow, and to direct fluid flow away from sealing surfaces of the sealing components. Further, in some embodiments, the gas lift valve assemblies described herein utilize a uniquely shaped valve member configured to divert fluid flow away from a sealing surface of the valve member, and to inhibit solid particles from bouncing upstream and contacting other sealing components of the valve assembly.

An exemplary technical effect of the systems, methods, and apparatus described herein includes at least one of: (a) facilitating reducing the leakage rate of gas lift valve assemblies used in artificial gas lift systems; (b) improving the service life and reliability of gas lift valve assemblies used in artificial gas lift valve assemblies; and (c) decreasing the wear rate of sealing components used in gas lift valve assemblies of artificial gas lift systems.

Exemplary embodiments of gas lift systems and gas lift valve assemblies are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with the specific embodiments described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gas lift valve assembly comprising:
a housing defining an inlet port, an outlet port, and a main flow passage providing fluid communication between the inlet port and the outlet port, the main flow passage having an upstream end and a downstream end;
a check valve comprising:
a low pressure sealing element disposed at the downstream end of the main flow passage and defining a low pressure sealing surface;
a high pressure sealing element defining a high pressure sealing surface downstream from said low pressure sealing surface; and a valve member configured to sealingly engage said low pressure sealing element and said high pressure sealing element, said valve member movable between an open position in which fluid flow is permitted in a downstream direction, and a closed position in which said valve member inhibits fluid flow in an upstream direction; and a fluid flow barrier disposed laterally between said low pressure sealing element and the main flow passage, said fluid flow barrier configured to direct fluid flow away from said low pressure sealing element when said valve member is in the open position.

2. The gas lift valve assembly in accordance with claim 1, wherein said valve member is configured to sealingly engage said low pressure sealing element at a first pressure differential across said valve member, and to sealingly engage said high pressure sealing element at a second pressure differential across said valve member greater than the first pressure differential.

3. The gas lift valve assembly in accordance with claim 2, wherein said high pressure sealing element comprises a portion of said housing.

4. The gas lift valve assembly in accordance with claim 1, wherein said low pressure sealing element comprises at least one of an elastomer and a thermoplastic.

5. The gas lift valve assembly in accordance with claim 1, wherein said valve member includes a sealing surface and a fluid diversion surface, said fluid diversion surface configured to divert fluid flowing in the downstream direction away from said sealing surface to inhibit erosion of said sealing surface.

6. The gas lift valve assembly in accordance with claim 5, wherein said fluid diversion surface includes an erosion resistant coating.

7. The gas lift valve assembly in accordance with claim 1, wherein said fluid flow barrier comprises an annular collar defined by said housing, said collar extending radially inward into the main flow passage and at least partially defining an annular groove in said housing, said low pressure sealing element disposed within the groove.

8. The gas lift valve assembly in accordance with claim 7, wherein said collar defines a plurality of slots spaced circumferentially around said collar, said valve member comprising a plurality of alignment members extending longitudinally upstream into the main flow passage, each alignment member configured to slidingly engage said collar within one of the slots to maintain alignment of said valve member.

9. The gas lift valve assembly in accordance with claim 1, wherein said fluid flow barrier comprises an annular collar coupled to said valve member, said collar moveable in a longitudinal direction within the main flow passage when said valve member moves between the open position and the closed position.

10. The gas lift valve assembly in accordance with claim 9, wherein said collar is free of openings such that said collar completely covers said low pressure sealing element along a radial inner surface thereof when said valve member is in the open position.

11. The gas lift valve assembly in accordance with claim 1, wherein said check valve is coupled in fluid communication between the main flow passage and the outlet port.

12. The gas lift valve assembly in accordance with claim 1, further comprising an injection control valve coupled in serial fluid communication with and upstream from said check valve, said injection control valve configured to regulate fluid flow between the inlet port and the main flow passage.

13. A method of assembling a gas lift valve assembly, said method comprising:

providing a housing defining an inlet port, an outlet port, and a main flow passage providing fluid communication between the inlet port and the outlet port, the main flow passage having an upstream end and a downstream end;

providing a low pressure sealing element at the downstream end of the main flow passage, the low pressure sealing element defining a low pressure sealing surface;

providing a high pressure sealing element defining a high pressure sealing surface downstream from the low pressure sealing surface;

coupling a valve member to the housing such that the valve member is moveable between an open position in which fluid flow is permitted in a downstream direction, and a closed position in which the valve member sealingly engages the low pressure sealing element and the high pressure sealing element; and providing a fluid flow barrier laterally between the low pressure sealing element and the main flow passage such that the fluid flow barrier directs fluid away from the low pressure sealing element when the valve member is in the open position.

14. The method in accordance with claim 13, further comprising providing the low pressure sealing element and the high pressure sealing element such that the low pressure sealing element is configured to sealingly engage the valve member at a first pressure differential across the valve member, and such that the high pressure sealing element is configured to sealingly engage the valve member at a second pressure differential across the valve member greater than the first pressure differential.

15. The method in accordance with claim 13, wherein providing a fluid flow barrier comprises providing an annular collar fixed to the housing such that the collar extends radially inward into the main flow passage and at least partially defines an annular groove in the housing, and wherein providing a low pressure sealing element comprises positioning the low pressure sealing element within the annular groove.

16. The method in accordance with claim 13, wherein providing a fluid flow barrier comprises coupling an annular collar to the valve member such that the collar is moveable in a longitudinal direction within the main flow passage when the valve member moves between the open position and the closed position, the collar being substantially free of openings such that the collar completely covers the low pressure sealing element along a radial inner surface thereof when the valve member is in the open position.

17. A gas lift system comprising:

a production tubing defining a central passageway;

a well casing defining an annulus between said production tubing and said well casing; and a gas lift valve assembly coupled in fluid communication between the annulus and the central passageway, said gas lift valve assembly comprising:

a housing defining an inlet port, an outlet port, and a main flow passage providing fluid communication between the inlet port and the outlet port, the main flow passage having an upstream end and a downstream end;

a check valve comprising:

a low pressure sealing element disposed at the downstream end of the main flow passage and defining a low pressure sealing surface;

a high pressure sealing element defining a high pressure sealing surface downstream from said low pressure sealing surface; and a valve member configured to sealingly engage said low pressure sealing element and said high pressure sealing element, said valve member movable between an open position in which fluid flow is permitted from the annulus to the central passageway, and a closed position in which said valve member inhibits fluid flow from the central passageway to the annulus; and a fluid flow barrier disposed laterally between said low pressure sealing element and the main flow passage, said fluid flow barrier configured to direct fluid flow away from said low pressure sealing element when said valve member is in the open position.

18. The gas lift system in accordance with claim 17, wherein said valve member is configured to sealingly engage said low pressure sealing element at a first pressure differential across said valve member, and to sealingly engage said high pressure sealing element at a second pressure differential across said valve member greater than the first pressure differential.

19. The gas lift system in accordance with claim 17, wherein said fluid flow barrier comprises an annular collar defined by said housing, said collar extending radially inward into the main flow passage and at least partially defining an annular groove in said housing, said low pressure sealing element disposed within the groove.

* * * * *